(12) United States Patent
Boucard et al.

(10) Patent No.: US 8,254,380 B2
(45) Date of Patent: Aug. 28, 2012

(54) MANAGING MESSAGES TRANSMITTED IN AN INTERCONNECT NETWORK

(75) Inventors: Philippe Boucard, Chesnay (FR); Vincent Vacquerie, Longnes (FR)

(73) Assignee: Arteris, Guyancourt (FR)

( * ) Notice: Subject to any disclaimer, the term of this patent is extended or adjusted under 35 U.S.C. 154(b) by 675 days.

(21) Appl. No.: 11/516,811

(22) Filed: Sep. 6, 2006

(65) Prior Publication Data

US 2007/0297404 A1 Dec. 27, 2007

(30) Foreign Application Priority Data

Jun. 23, 2006 (FR) ...................................... 06 05646

(51) Int. Cl.
*H04L 12/28* (2006.01)
*H04L 12/56* (2006.01)
*H04L 12/413* (2006.01)
*H04J 3/02* (2006.01)

(52) U.S. Cl. .......................... 370/389; 370/447; 370/462

(58) Field of Classification Search .......................... None
See application file for complete search history.

(56) References Cited

U.S. PATENT DOCUMENTS

| | | | |
|---|---|---|---|
| 2,243,851 A | 6/1941 | Booth et al. |
| 5,313,649 A | 5/1994 | Hsu et al. |
| 5,408,634 A | 4/1995 | Joho |
| 5,424,590 A | 6/1995 | Sato et al. |
| 5,453,982 A | 9/1995 | Pennington et al. |
| 5,473,761 A | 12/1995 | Parks et al. |
| 5,495,197 A | 2/1996 | Hayashi et al. |
| 5,541,932 A | 7/1996 | Nguyen et al. |
| 5,604,775 A | 2/1997 | Saitoh et al. |
| 5,651,002 A | 7/1997 | Van Seters et al. |
| 5,764,093 A | 6/1998 | Hayashi et al. |
| 5,784,374 A | 7/1998 | Runaldue |
| 5,844,954 A | 12/1998 | Casasanta et al. |
| 5,931,926 A | 8/1999 | Yeung et al. |
| 6,151,316 A | 11/2000 | Crayford et al. |
| 6,211,739 B1 | 4/2001 | Synder et al. |
| 6,260,152 B1 | 7/2001 | Cole et al. |
| 6,269,433 B1 | 7/2001 | Jones et al. |

(Continued)

FOREIGN PATENT DOCUMENTS

EP 752642 1/1997

(Continued)

OTHER PUBLICATIONS

K. Toda, K. Nishida, E. Takahashi, N. Michell, Y. Yamaguchi, "Implementation of a Priority Forwarding Router Chip for Real-Time Interconnection Network", IEEE, 1994. pp. 166-175.*

(Continued)

*Primary Examiner* — Gregory Sefcheck
*Assistant Examiner* — Suk Jin Kang
(74) *Attorney, Agent, or Firm* — Fish & Richardson P.C.

(57) ABSTRACT

The system for managing messages transmitted in an interconnect network connecting blocks on a chip comprises agents linked by point-to-point links able to transmit, by static routing, messages comprising a priority information item quantified on N levels. The system comprises at least one agent initiating request messages to at least one recipient agent. A request message comprises a header and, where appropriate, content data. The system comprises means of generating a priority message, to a recipient agent, to which at least on request message has previously been transmitted with no response message received in return.

28 Claims, 2 Drawing Sheets

U.S. PATENT DOCUMENTS

| | | | |
|---|---|---|---|
| 6,278,709 B1 * | 8/2001 | Walker et al. | 370/392 |
| 6,339,553 B1 | 1/2002 | Kuge | |
| 6,400,720 B1 | 6/2002 | Ovadia et al. | |
| 6,549,047 B2 | 4/2003 | Yamazaki et al. | |
| 6,651,148 B2 | 11/2003 | Widdup | |
| 6,661,303 B1 | 12/2003 | Ghoshal | |
| 6,721,309 B1 | 4/2004 | Stone et al. | |
| 6,738,820 B2 | 5/2004 | Hilt | |
| 6,759,911 B2 | 7/2004 | Gomm et al. | |
| 6,778,545 B1 | 8/2004 | Moataghed | |
| 6,812,760 B1 | 11/2004 | Kim et al. | |
| 6,850,542 B2 | 2/2005 | Tzeng | |
| 6,901,074 B1 | 5/2005 | Yamasaki | |
| 6,915,361 B2 | 7/2005 | Alpert et al. | |
| 7,050,431 B2 | 5/2006 | Tzeng | |
| 7,148,728 B2 | 12/2006 | Montperrus et al. | |
| 2002/0085582 A1 | 7/2002 | Kim | |
| 2002/0191603 A1 * | 12/2002 | Shin et al. | 370/389 |
| 2002/0196785 A1 | 12/2002 | Connor | |
| 2003/0093630 A1 | 5/2003 | Richard et al. | |
| 2003/0227932 A1 | 12/2003 | Meempat et al. | |
| 2004/0017807 A1 * | 1/2004 | Dorr et al. | 370/389 |
| 2004/0017820 A1 * | 1/2004 | Garinger et al. | 370/419 |
| 2004/0024946 A1 * | 2/2004 | Naumann et al. | 710/309 |
| 2004/0088472 A1 | 5/2004 | Nystuen et al. | |
| 2004/0128413 A1 | 7/2004 | Chelcea et al. | |
| 2005/0025169 A1 * | 2/2005 | Douady et al. | 370/415 |
| 2005/0086412 A1 | 4/2005 | Douady et al. | |
| 2005/0100014 A1 | 5/2005 | Brown et al. | |
| 2005/0104644 A1 | 5/2005 | Montperrus et al. | |
| 2005/0108420 A1 | 5/2005 | Brown et al. | |
| 2005/0117589 A1 * | 6/2005 | Douady et al. | 370/395.42 |
| 2005/0135355 A1 * | 6/2005 | Muthukrishnan et al. | 370/389 |
| 2005/0141505 A1 | 6/2005 | Douady et al. | |
| 2005/0154843 A1 | 7/2005 | Douady et al. | |
| 2005/0157717 A1 | 7/2005 | Douady et al. | |
| 2005/0210325 A1 | 9/2005 | Douady et al. | |
| 2005/0249113 A1 * | 11/2005 | Kobayashi et al. | 370/219 |
| 2007/0002634 A1 | 1/2007 | Montperrus | |
| 2007/0081414 A1 | 4/2007 | Douady et al. | |
| 2007/0110052 A1 | 5/2007 | Kok et al. | |
| 2008/0205432 A1 * | 8/2008 | Gangwal | 370/458 |

FOREIGN PATENT DOCUMENTS

| | | |
|---|---|---|
| FR | 2814007 | 3/2002 |
| WO | 0195089 | 12/2001 |

OTHER PUBLICATIONS

K. Toda, K. Nishida, S. Sakai, T. Shimada, "A Priority Forwarding Scheme for Real-Time Multi-stage Interconnection Networks", IEEE, Dec. 1992, pp. 208-217.*

A7.Olsson et al., "A Digital PLL made from Standard Cells" Proceedings from European Conference on Circuit Theory and Design (ECCTD) 2001, 4 pages.

A8.Olsson et al., "Fully integrated standard cell digital PLL" Electronic Letters, vol. 37, No. 4, Feb. 15, 2001, pp. 211-212.

A9.Olsson et al., "A Digitally Controlled PLL for Digital SOCs" IEEE International Symposium on Circuits and Systems, 2003, 4 pages.

Rogina et al., "Metastability Evaluation Method by Propagation Delay Distribution Measurement", IEEE Fourth Asian Test Symposium, 1995, p. 40-44.

Brown, "Measuring Metastability and its Effect on Communication Signal Processing Systems", IEEE Transactions on Instrumentation and Measurement, 1997:45:61-64.

Co-pending U.S. Appl. No. 11/482,175 entitled "System of Interconnections for External Functinal Blocks on a Chip Provided with a Single Configurable Communication Protocol" filed Jul. 6, 2006.

Co-pending U.S. Appl. No. 11/483,419 entitled "Process for Designing a Circuit for Synchronizing Data Asynchronously Exchanged Between two Synchronous Blocks, and Synchronization Circuit Fabricated by Same" filed Jul. 7, 2006.

Co-Pending U.S. Appl. No. 11/585,837 entitled "Message Switching System" filed Jul. 11, 2006.

Co-pending U.S. Appl. No. 11/518,384 entitled "System for Managing Messages transmitted in an on-Chip Interconnect Network" filed Sep. 8, 2006.

Preliminary Examination Report for FR. 05/09279 issued May 9, 2006 (1 page).

Cheung et al., "Fuzzy Service Scheduling Scheme in ATM Networks", IEEE, Jun. 11, 2001, pp. 3122-3123.

French Search Report for French Application No. 0606833, 1 page.
French Search Report for French Application No. 0605646, 1 page.
French Search Report for French Application No. 0604348, 1 page.
Mu et al., "Self-tested Self-synchronization Circuit for Mesochronous Clocking", IEEE Transactions on Circuits and Systems II: Analog and Digital Signal Processing, 2001: 48:129-140.

* cited by examiner

US 8,254,380 B2

MANAGING MESSAGES TRANSMITTED IN AN INTERCONNECT NETWORK

RELATED APPLICATION

This application claims the benefit of priority under 35. U.S.C. 119(a)-(d) to French Patent Application No. FR 06/05646, filed Jun. 23, 2006, which is incorporated by reference herein in its entirety.

TECHNICAL FIELD

The present invention relates to a system and a method for managing messages transmitted in an interconnect network of IP blocks on a chip, in particular a silicon chip.

More particularly, the invention applies to an interconnect network comprising agents linked by point-to-point links able to transmit messages comprising a priority information item. Document FR 2 858 895 is known for this purpose.

BACKGROUND

On-chip systems comprise components, or intellectual property (IP) blocks, communicating via an interconnect network on-chip.

These components handle data processing functions and generate data traffic with generally different characteristics and constraints.

For example, one application may require a bandwidth greater than a minimum bandwidth, and another application may require a latency less than a maximum latency. Consequently, an interconnect network on-chip needs to offer service guarantees for all the components included in the on-chip system.

As a general rule, monitoring the quality of service on a network should provide a means of best managing the existing resources according to the constraints of the network.

For example, a link optimized for priority data traffic can allow lower priority data to be transported when a portion of the link bandwidth is available.

For a user, the service quality, in the context of component operation, needs to enable a defined or predictable behaviour to be provided. For example, a reader of data recorded in DVD format needs to be capable of decoding the video and sound components of a film so as to restore them in a fluid manner.

SUMMARY

One aim of the invention is to manage messages transmitted in an interconnect network on-chip, so as to ensure a good quality of service for an application.

Another aim of the invention is to facilitate the arrival of a request message intended for a recipient agent when said message is blocked in the network because of a low priority level and/or network congestion.

Thus, according to one aspect of the invention, there is proposed a system for managing messages transmitted in a network connecting blocks on a chip. The system comprises agents linked by point-to-point links able to transmit, by static routing, messages comprising a priority information item quantified on N levels, and comprises at least one initiating agent sending request messages to at least one recipient agent. A request message comprises a header and, where appropriate, content data. The system comprises means of determining a current priority, and means of generating a priority message designed to generate a priority message when said current priority is greater than the priority of the last request message previously transmitted by said initiating agent to said recipient agent with no response message received in return. Furthermore, the system comprises propagation means for propagating, in the interconnect network, based on a priority message sent by said generation means, the priority level of said priority message, to said request message or messages, so that said request messages present on the routing path of said recipient agent are treated as request messages having a priority level equal to the priority level of said priority message.

Thus, when a request message is blocked in the network, the message traffic in the network is degraded, and the current priority of the system is increased. When there are no more transactions from the initiating agent, it is determined, for each recipient agent, whether there remains at least one request message present in the interconnect network with no response and of priority lower than the current priority. If there remains at least one, a priority message is sent to the corresponding recipient agent to simulate, for the blocked message, the priority level of the priority message, using a priority level propagation, and to speed up its processing.

The system comprises a static routing for which all the messages sent by a first agent of the network to a second agent of the network pass via the same links forming the routing path between the first agent and the second agent.

Thus, all the messages from the initiating agent to the recipient agent use the same routing path, and all the request messages previously transmitted and still present on the routing path from the initiating agent to the recipient agent benefit from the priority level of the priority message.

A priority message is sent when the initiating agent cannot send a next message with a higher priority level, because it has to receive the response to a previous request message, before it can send a next message. Such is the case, for example, for a central processing unit performing a computation operation.

The system is less expensive in comparison to an overdimensioned interconnect network.

Furthermore, the system provides a way of avoiding the problems of low bandwidth obtained by circuit switching, in which a physical or logical path is set up between two agents and is blocked for the entire duration of the communication. The switching of a physical link between an initiating agent and a recipient agent throughout the communication time between the two agents makes the average bandwidth dedicated to the switched link very low, because, normally, the recipient agent is not immediately available. The system ensures a minimum bandwidth without degradation for the other traffic in critical situation cases.

Moreover, the system provides a way of avoiding a strong reduction in the bandwidth present on time-division multiplexing of a link, so that, given a regular frequency, the use of the link by a number of initiating agents can be guaranteed. In practice, if a link has been partially reserved for an initiating agent and the latter does not send data for a certain time, the bandwidth of the link drops sharply.

For example, the priority message comprises only a header and no content data, which does not result in any reduction in the bandwidth. The size of the message is then very short, and provokes an additional, negligible congestion of the network.

In an embodiment, the system comprises, in addition:
  assignment means designed to replace with the current priority, or leave unchanged, the initial priority level of a request message sent by said initiating agent to said recipient agent, according to the value of a parameter representative of the state of the network; and means of managing information relating to the request messages transmitted by said assignment means to said recipient agent.

Just after it has been sent, a request message can have its priority level modified to take account of the state of the network.

In an embodiment, said means of determining the current priority are designed to determine the current priority level according to the position of the value of a parameter representative of the state of the network, in relation to N−1 threshold values defining N ranges of values of said parameter, respectively associated with said N priority information levels.

It is then possible to adapt the priority level of a request message sent according to the state of the network, with N priority levels. Thus, it is possible, in a critical situation case, to recover the bandwidth.

According to an embodiment, said management means comprise storage means and means of updating parameters representative of the request messages transmitted by said assignment means to a recipient agent. Said parameters comprise an indicator representative of said initiating agent, an indicator representative of said recipient agent, the priority level assigned by said assignment means to the last request message sent by said initiating agent or by said generation means to said recipient agent, and a counter of the number of request messages transmitted by said assignment means to said recipient agent and not having been the subject of a response message received by said initiating agent.

According to an embodiment, said propagation means comprise transmission means, respectively dedicated to an output of an agent, designed to determine an input priority information item, respectively dedicated to an input of said agent, of value equal to the maximum level between a priority information item of a message present at said input and a link priority information item of the link from said input, and designed to propagate, over the link of the corresponding output, a priority information item of value equal to the maximum of the values of said input priority information items relating to the inputs comprising a message for which the input required said corresponding output.

According to an embodiment, said propagation means are designed to propagate, at the output of a queue, a link priority information item equal to the maximum level of the priority information items of the messages present in said queue and a link priority information item of the input link of said queue.

According to an embodiment, said parameter representative of the state of the network comprises the quantity of data stored in a queue of said initiating agent.

This is, for example, a queue of data in response to request messages. If the initiating agent is a DMA type memory with direct access, the aim is to avoid traffic breaks when reconstructing a unique response based on responses originating from a number of recipient agents, for example when reconstructing a video frame. When the queue is almost empty, the current priority is increased, and when the queue is almost full, the current priority is reduced.

According to an embodiment, said parameter representative of the state of the network comprises the number of periods of the clock timing signal controlling the sending of messages from said initiating agent separating the sending of a request message from said initiating agent and the receipt of the associated response message.

The more the measured latency increases, the more the current priority is increased, in order to keep it at a sufficiently low level.

According to an embodiment, said parameter representative of the state of the network comprises a pseudo-data rate, calculated by adding up, for a request message sent by the initiating agent to said recipient agent, the quantity of data associated with said request message, and by subtracting a predetermined quantity of data for each period of the clock timing signal controlling the sending of messages from said initiating agent.

The data associated with a request message can be the content data of the request, for example, in a data write request, or the content of the response message associated with the request, for example, in a data read request.

The device provides a way of reserving a portion of bandwidth for the initiating agent, as long as the latter does not risk saturating the network, and in the event of an overrun, the initiating agent can always recover bandwidth, but this time with no guarantee.

According to an embodiment, the system comprises a threshold value defining two levels of priority information, corresponding to priority messages and non-priority messages.

It is possible to create such a network with only two priority levels.

According to an embodiment, said recipient agent is designed, in response to a priority message from said generation means associated with said initiating agent, to transmit a priority message of equal priority level to said initiating agent.

It is thus possible to propagate this priority level over the routing path of the response messages in return from the request messages, and thus, with the propagation of the priority level of the priority message, to have the response messages previously returned and still on the routing path of the response messages also benefit from the priority level of the priority message.

According to an embodiment, the storage means comprise a CAM memory.

A CAM memory is an addressable memory or an associative memory, in which the position of a data item is determined by its content and not by an address.

In an embodiment, there is proposed a system for managing messages transmitted in an interconnect network connecting blocks on a chip. The system comprises agents linked by point-to-point links able to transmit messages comprising a priority information item quantified on N levels, and comprises an initiating agent sending request messages to at least one recipient agent. A request message comprises a header and content data. The system comprises means of generating a priority message, to a recipient agent to which at least one request message has previously been transmitted. A priority message generated by said generation means comprises a priority information item of a level higher than the priority level of said request message previously transmitted to said recipient agent. The priority message is generated to speed up the arrival of the request message at the recipient agent, the priority message and the request message passing via the same links. The request message benefits from the priority level of said priority message.

According to another aspect of the invention, there is proposed a method of managing messages transmitted in an interconnect network connecting blocks on a chip. Said network comprises agents linked by point-to-point links able to transmit, by static routing, messages comprising a priority information item quantified on N levels, and comprises at least one initiating agent sending request messages to at least one recipient agent. A request message comprises a header and, where appropriate, content data. A current priority is determined, and a priority message is generated when said current priority is greater than the priority of the last request message previously transmitted by said initiating agent to said recipient agent with no response message received in return. Furthermore, the priority level of said priority message is propagated in the interconnect network, based on a generated priority message, to said request message or messages, so that said request messages present on the routing path of said recipient agent are treated as request messages having a priority level equal to the priority level of said priority message.

According to an embodiment, the initial priority level of a request message sent by said initiating agent to said recipient agent is replaced with the current priority or left unchanged, according to the value of a parameter representative of the state of the network, and information is managed relating to the request messages transmitted, after assignment, to said recipient agent.

Other aims, characteristics and advantages of the invention will become apparent from reading the description that follows, of a few examples that are by no means limiting, and given with reference to the appended drawings, in which:

DETAILED DESCRIPTION

Figure 1:
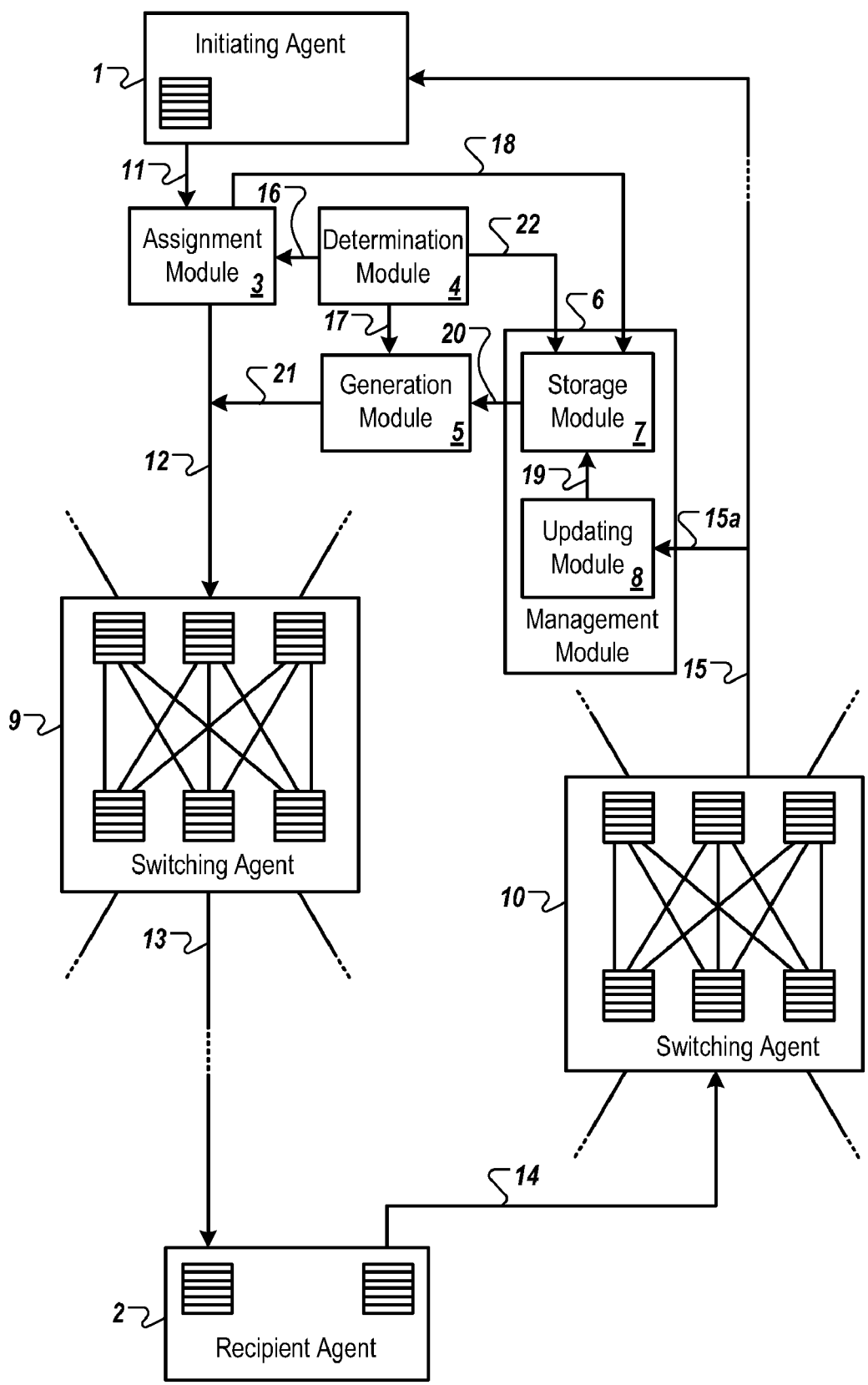
FIG. 1 is a schematic view of an embodiment of a system for managing messages transmitted in an interconnect network of IP blocks on a silicon chip, according to one aspect of the invention.

As illustrated in FIG. 1, a system for managing messages transmitted in an interconnect network connecting blocks on a chip comprises an initiating agent 1 and a recipient agent 2. An interconnect network is described in document FR 2 858 895 to which the reader is referred. The document FR 2 858 895 gives an example of priority propagation.

The interconnect network comprises agents 1, 2, 9 and 10 linked by point-to-point links able to transmit, by static routing, messages comprising a priority information item quantified on N levels.

The links of the interconnect network are unidirectional links.

The number N of priority levels is unlimited, but it is preferably equal to 2 or 3.

Only one recipient agent 2 is represented in FIG. 1, but the invention applies to an embodiment in which several initiating agents exchange messages with a plurality of recipient agents. In this case, the resources are shared.

The system also comprises an assignment module 3, a module 4 for determining the value of a parameter representative of the state of the interconnect network, and a module 5 for generating priority messages. The assignment module 3 is capable of modifying or leaving unchanged the priority level of a request message sent by the initiating agent 1.

Furthermore, the system comprises a module 6 for managing information relating to the request messages transmitted by the assignment module 3 to the recipient agent 2. The management module 6 is used to manage or, in other words, to store and update, information concerning the request messages sent by the initiating agent 1 for the recipient agent 2.

The management module 6 comprises a module 7 for storing, and a module 8 for updating parameters representative of the request messages transmitted by the assignment module 3 to the recipient agent 2. The storage module 7 is used to store the values of said parameters in memory.

A number of switching agents can be disposed on the request message path between the initiating agent 1 and the recipient agent 2, and a number of switching agents can be disposed on the response message path between the recipient agent 2 and the initiating agent 1.

In this example, only one switching agent 9 and one switching agent 10 have respectively been represented on the request routing path between the initiating agent 1 and the recipient agent 2 and on the response routing path between the recipient agent 2 and the initiating agent 1.

The initiating agent 1 is connected to the assignment module 3 by a unidirectional link 11. The assignment module 3 is connected to an input of the switching agent 9 by a unidirectional link 12.

An output of the switching agent 9 is connected to the recipient agent 2 by a unidirectional link 13.

The recipient agent 2 is connected to an input of the switching agent 10 by a unidirectional link 14, and an output of the switching agent 10 is connected to the initiating agent 1 by a unidirectional link 15.

Furthermore, the unidirectional link 15 is connected, by a branch 15a, to the updating module 8 to enable the updating module 8 to receive as input the response messages from the recipient agent 2, in order to be able to update the values of the parameters stored by the storage module 7.

The determination module 4 is connected by a link 16 to the assignment module 3, and to the generation module 5 by a link 17.

The assignment module 3 is connected to the storage module 7 by a link 18. Thus, when the assignment module 3 transmits a request message sent by the initiating agent (1) to the recipient agent 2, the storage module 7 can store values of parameters representative of this request message with, where appropriate, a priority level modified by the assignment module 3.

Furthermore, the updating module 8 is connected to the storage module 7 by a link 19, enabling the updating module 8 to update the values of the parameters stored by the storage module 7.

The storage module 7 is connected to the generation module 5 by a link 20 in order to enable the header of a priority message to be constructed from data contained in the storage means 7, when the management module 6 decides to have a priority message generated by the generation module 5. Furthermore, the generation module 5 is connected to the link 12 by a link 21. The determination module 4 and management module 6 are connected by a link 22 for transmitting the current priority level defined by the determination module 4 in order for the management module 6 to be able to compare it with the priority level stored in the storage module 7, to determine whether a priority message must be sent.

The parameter representative of the state of the network, determined by the determination module 4, can, for example, be the quantity of data stored in a response queue of the initiating agent 1. The parameter representative of the state of the network, determined by the determination module 4, can also be the number of periods of the clock timing signal controlling the sending of messages from the initiating agent 1, separating the sending of a request message from said initiating agent 1 and the receipt of the associated response message. Furthermore, the parameter representative of the state of the network, determined by the determination module 4, can be a pseudo-data rate, calculated by adding up, for a request message sent by the initiating agent 1 to the recipient agent 2, and transmitted by the assignment module 3, the quantity of data associated with the message, and by subtracting a predetermined quantity of data for each period of the clock timing signal controlling the sending of messages from the initiating agent 1. The data associated with a request message can be the content data of the request, in a data write request for example, or the content of the response message associated with the request, in a data read request for example.

Of course, the parameter representative of the state of the network is not limited to these three examples.

In the rest of the description, the parameter representative of the state of the network is said pseudo-rate, and the determination module 4 determines the value of the pseudo-rate.

The description relates to the general case with N priority levels, but a case often used is with two priority levels: priority and non-priority.

When the initiating agent 1 sends a request message to the recipient agent 2, the latter is transmitted by the link 11.

Depending on the value of the pseudo-rate determined by the determination module 4 and transmitted to the assignment module 3 by the link 16, the assignment module 3 modifies or leaves unchanged the priority level included in the header of the message sent by the initiating agent 1.

The assignment module 3 comprises N−1 stored pseudo-rate threshold values, determining N ranges of pseudo-rate values respectively associated with N priority levels.

Depending on the determined value of the pseudo-rate, the assignment module 3 assigns the message sent by the initiating agent 1 the priority level corresponding to one of the N ranges containing the value of the pseudo-rate determined by the determination module 4.

Also, the assignment module 3 transmits the message sent by the initiating agent 1 over the link 12, either with the same priority information level or with a new priority level.

The storage module 7 is used to store the value of parameters representative of the request messages transmitted by the assignment module 3 to the recipient agent 2.

These parameters comprise, for example, an indicator representative of the initiating agent 1, an indicator representative of the recipient agent 2, the level of the priority information assigned by the assignment module 3 to the last request message sent by the initiating agent 1 or by the generation module 5 to the recipient agent 2, and a counter of the number of request messages transmitted by the assignment module 3 to the recipient agent 2 with no corresponding response message returned.

The updating module 8 is used, via the link 19, to update the value of the parameters stored in the storage module 7, according to the response messages transmitted by the recipient agent 2 to the initiating agent 1 via the links 14 and 15, also transmitted to the updating module 8 via the link 15a.

According to the values of the parameters stored in the storage module 7, transmitted to the generation module 5 via the link 20, the generation module 5 can generate a priority message destined for recipient agent 2 to which at least one request message has previously been transmitted without the initiating agent 1 having received the associated response message in return.

The priority level of this priority message is then propagated to the request messages previously transmitted by the initiating agent 1 to the recipient agent 2 that are blocked in the network between the initiating agent 1 and the recipient agent 2.

The recipient agent 2 is also capable, when it receives a priority message, of transmitting, in return, a response message of equal priority level, to the initiating agent 1, so as to propagate the priority level of the priority message over the routing path of the return messages to the initiating agent 1.

Thus, the priority level of this priority message can be propagated on this return path, which can contain response messages blocked in return. In combination with the priority propagation mechanism, these messages then benefit from the priority level of the priority message.

A priority message is sent by the generation module 5 when the initiating agent 1 is no longer sending request messages to the recipient agent 2, and there is at least one request message, of a priority level lower than the current priority level, previously transmitted with no response message received in return.

In practice, if the initiating agent 1 could send a new request message with a higher priority, the latter would propagate this priority using the priority propagation mechanisms provided. In other words, if the initiating agent 1 can send a message, it sends it with the current priority, which makes it pointless to send a priority message.

Figure 2:
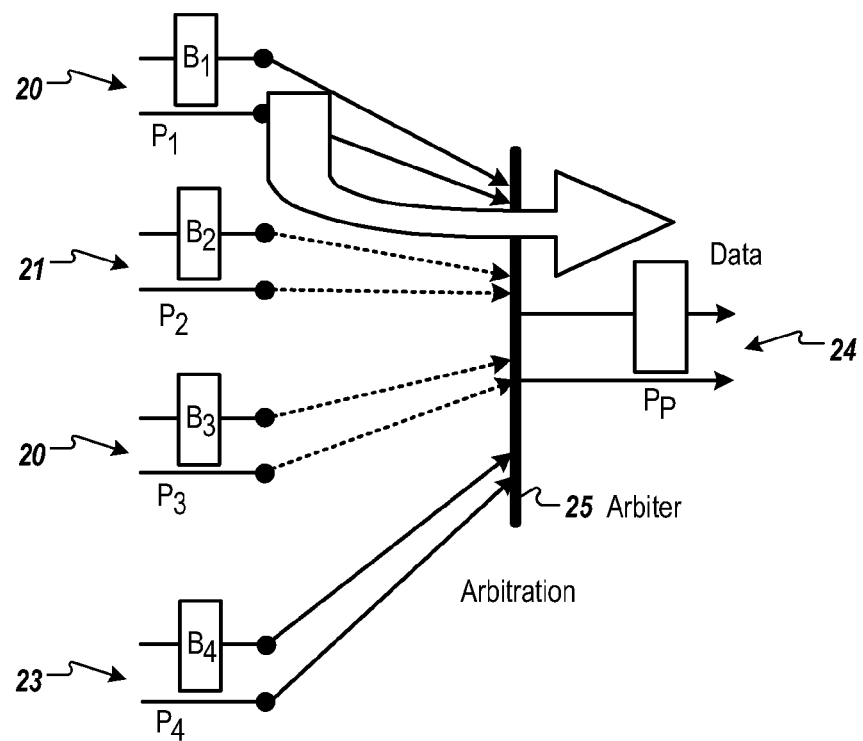
FIGS. 2 and 3 illustrate the propagation in the interconnect network of the level of the priority information of a priority message, according to one aspect of the invention.
Figure 3:
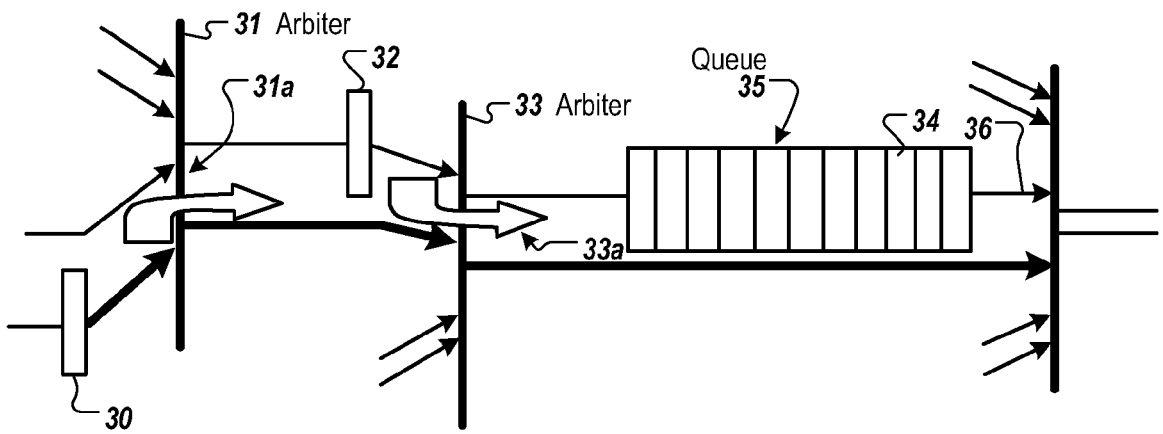

The mechanism for propagating the priority information level of a priority message or a message of higher priority level is illustrated in more detail in FIGS. 2 and 3.

FIG. 2 illustrates a switching agent comprising four inputs 20, 21, 22 and 23 and one output 24 for transmitting messages to the recipient agent 2.

An arbitration is applied for each output, in this case by an arbiter 25.

Four messages $B_1$, $B_2$, $B_3$ and $B_4$ are respectively input to the switching agent on the inputs 20, 21, 22 and 23.

$P_1$, $P_2$, $P_3$ and $P_4$ represent the respective priority levels propagated on the links of the inputs 20, 21, 22 and 23.

In this example, only the inputs 20 and 23 want to be assigned the output 24, the inputs 21 and 22 having not at this moment a message present as input for the output 24.

Also, the propagated priority $P_p$ output from the switching agent will be equal to the maximum of the priority information level of the message $B_1$, of the priority information level of the message $B_4$, of the priority information level $P_1$ associated with the input 20 link, and of the priority information level $P_4$ associated with the input 23 link.

The priority message takes the same path as the blocked message that is to be unblocked. This priority message makes the blocked message similar to a message of equal priority level and thus favours its unblocking so that it can arrive at the recipient element. In other words, this priority message pushes the messages that are slowing down its progression, and finishes by propagating its priority on the path leading to the recipient element to the blocked message and thus favours its unblocking.

Since the progression of the priority message is favoured, and it cannot duplicate the blocked data packet, it will end up pushing the latter if the latter is still blocked, and thus, everything proceeds as if the blocked packet had inherited the priority level of the priority packet.

Such a priority propagation is illustrated in FIG. 3.

A priority message 30 is selected by an arbiter 31 dedicated to an output 31a of a first switching agent, while the message 32 that precedes it and that uses the path to the recipient element is being transferred through a second switching agent by being selected by an arbiter 33 of an output 33a of the second switching agent to the recipient agent.

A request message 34 to the recipient agent is blocked in a queue 35 into which the message 32 enters.

With the priority propagation, the priority information level of the priority message is propagated through the first two switching agents and will make an input 36 of a third switching agent priority, because all the messages present in the queue 35, including the message 34 that is to be pushed, inherit this priority level.

Also, the invention makes it possible to simulate an increase in the priority level of a request message already transmitted in the network, for which a response message is awaited.

In other words, when an initiating agent has sent a request message to a recipient agent, and this request has a low priority level, the priority being dependent on a parameter representative of the state of the network, and this request message is blocked at a point on the routing path from the initiating agent to the recipient agent because other messages of higher priority level are in front of it, the invention makes it possible to have this blocked message benefit from a higher priority level in order to route it to its destination. The response message can then be sent more quickly to the initiating agent.

The invention claimed is:

1. A system for managing message packets transmitted in an interconnect network connecting blocks on a chip, the system comprising:

agents linked by point-to-point links able to transmit, by static routing, message packets comprising a priority information item quantified on N levels where N is a positive integer value, and comprising at least one agent initiating a request message packet to at least one recipient agent, said request message packet comprising at least a header, the system further comprising:

modules configured for determining a current priority, generating a priority message packet destined to said recipient agent when said current priority is greater than the priority of a last request message packet previously transmitted by said initiating agent to said recipient agent, and propagating, in the interconnect network, based on said priority message packet sent by said generation module, the priority level of said priority message packet, to said request message packet, so that said request message packet present on a routing path of said recipient agent is treated as request message packet having a priority level equal to the priority level of said priority message packet; and an assignment module configured to replace with the current priority, or leave unchanged, an initial priority level of the request message packet sent by said initiating agent to said recipient agent, according to a value of a parameter representative of a state of the network, and where said parameter representative of the state of the network comprises a pseudo-data rate, calculated by adding up, for a request message packet sent by the initiating agent to said recipient agent, a quantity of data associated with said request message packet, and by subtracting a predetermined quantity of data for each period of a clock timing signal controlling the sending of message packets from said initiating agent.

2. The system according to claim 1, further comprising: management module configured for managing information relating to the request message packet transmitted by said assignment module to said recipient agent.

3. The system according to claim 2, in which said management module for determining the current priority s configured to determine the current priority level according to a position of the value of the parameter representative of the state of the network, in relation to N−1 threshold values defining N ranges of values of said parameter, respectively associated with said N priority information levels.

4. The system according to claim 3, in which said management module comprises storage and is configured for updating parameters representative of the request message packets transmitted by said assignment module to said recipient agent, said parameters comprising an indicator representative of said initiating agent, an indicator representative of said recipient agent, the priority level assigned by said assignment module to the last request message packet sent by said initiating agent or by said generation module to said recipient agent, and a counter of a number of request message packets transmitted by said assignment module to said recipient agent.

5. The system according to claim 4, in which the storage comprises a content-addressable memory (CAM).

6. The system according to claim 3, in which said propagation module comprise a transmission module, respectively dedicated to an output of an agent, designed to determine an input priority information item, respectively dedicated to an input of said agent, of value equal to a maximum level between a priority information item of a message packet present at said input of said agent and a link priority information item of the link from said input of said agent, and configured to propagate, over the link of a corresponding output of said agent, a priority information item of value equal to a maximum of values of input priority information items relating to inputs of said agent comprising a message packet for which the input required said corresponding output.

7. The system according to claim 6, in which said propagation module is designed to propagate, at an output of a queue, a link priority information item equal to a maximum level of priority information items of message packets present in said queue and a link priority information item of an input link of said queue.

8. The system according to claim 7, in which said parameter representative of the state of the network comprises a quantity of data stored in a queue of said initiating agent.

9. The system according to claim 7, in which said parameter representative of the state of the network comprises a number of periods of a clock timing signal controlling the sending of message packets from said initiating agent separating the sending of a request message packet from said initiating agent and the receipt of an associated response message packet.

10. The system according to claim 2, in which said parameter representative of the state of the network comprises a quantity of data stored in a queue of said initiating agent.

11. The system according to claim 2, in which said parameter representative of the state of the network comprises a number of periods of a clock timing signal controlling the sending of message packets from said initiating agent separating the sending of a request message packet from said initiating agent and the receipt of an associated response message packet.

12. The system according to claim 2, comprising a threshold value defining two levels of priority information, corresponding to priority message packets and non-priority message packets.

13. The system according to claim 1, in which said recipient agent is configured, in response to a priority message packet from said generation module associated with said initiating agent, to transmit a priority message packet of equal priority level to said initiating agent.

14. The system according to claim 1, comprising a threshold value defining two levels of priority information, corresponding to priority message packets and non-priority message packets.

15. A method of managing message packets transmitted in an interconnect network connecting blocks on a chip, said network including agents linked by point-to-point links able to transmit, by static routing, message packets comprising a priority information item quantified on N levels where N is a positive integer value, and comprising at least one agent initiating request message packet to at least one recipient agent, a request message packet comprising at least a header, the method comprising:

determining a current priority, generating a priority message packet destined to said recipient agent when said current priority is greater than the priority of a last request message packet previously transmitted by said initiating agent to said recipient agent, and in which the priority level of said priority message packet is propagated in the interconnect network, based on said generated priority message packet, to said request message packet, so that said request message packet present on a routing path of said recipient agent are treated as request message packets having a priority level equal to the priority level of said priority message packet; and replacing an initial priority level of a request message packet sent by said initiating agent to said recipient agent with the current priority or left unchanged, according to a value of a parameter representative of a state of the network, where said parameter representative of the state of the network comprises a pseudo-data rate, calculated by adding up, for a request message packet sent by the initiating agent to said recipient agent, a quantity of data associated with said request message packet, and by subtracting a predetermined quantity of data for each period of a clock timing signal controlling the sending of message packets from said initiating agent.

16. The method according to claim 15, in which:
information relating to the request message packets transmitted, after assignment, to said recipient agent, is managed.

17. The method according to claim 16, in which said propagation means comprise transmission means, respectively dedicated to an output of an agent, designed to determine an input priority information item, respectively dedicated to an input of said agent, of value equal to a maximum level between a priority information item of a message packet present at said input of said agent and a link priority information item of the link from said input of said agent, and configured to propagate, over the link of a corresponding output of said agent, a priority information item of value equal to a maximum of values of input priority information items relating to inputs of said agent comprising a message packet for which the input required said corresponding output.

18. The method according to claim 15, in which the storage means comprise a content-addressable memory (CAM).

19. A system for managing message packets transmitted in an interconnect network connecting blocks on a chip, the system comprising:
agents linked by point-to-point links able to transmit, by static routing, message packets comprising a priority information item quantified on N levels where N is a positive integer value, and comprising at least one agent initiating a request message packet to at least one recipient agent, said request message packet comprising at least a header, the system further comprising:
modules configured for determining a current priority, generating a priority message packet destined to said recipient agent when said current priority is greater than the priority of a last request message packet previously transmitted by said initiating agent to said recipient agent, and propagating, in the interconnect network, based on said priority message packet sent by said generation module, the priority level of said priority message packet, to said request message packet, so that said request message packet present on a routing path of said recipient agent is treated as request message packet having a priority level equal to the priority level of said priority message packet, and where said recipient agent is configured, in response to a priority message packet from said generation module associated with said initiating agent, to transmit a priority message packet of equal priority level to said initiator agent and the effective priorities of pending response packets are promoted to that of said priority message packet of equal priority level.

20. The system according to claim 19, further comprising:
management module configured for managing information relating to the request message packet transmitted by said assignment module to said recipient agent.

21. The system according to claim 20, in which said management module for determining the current priority is configured to determine the current priority level according to a position of the value of the parameter representative of the state of the network, in relation to N−1 threshold values defining N ranges of values of said parameter, respectively associated with said N priority information levels.

22. The system according to claim 21, in which said management module comprises storage and is configured for updating parameters representative of the request message packets transmitted by said assignment module to said recipient agent, said parameters comprising an indicator representative of said initiating agent, an indicator representative of said recipient agent, the priority level assigned by said assignment module to the last request message packet sent by said initiating agent or by said generation module to said recipient agent, and a counter of a number of request message packets transmitted by said assignment module to said recipient agent.

23. The system according to claim 22, in which the storage comprises a content-addressable memory (CAM).

24. The system according to claim 21, in which said propagation module comprise a transmission module, respectively dedicated to an output of an agent, designed to determine an input priority information item, respectively dedicated to an input of said agent, of value equal to a maximum level between a priority information item of a message packet present at said input of said agent and a link priority information item of the link from said input of said agent, and configured to propagate, over the link of a corresponding output of said agent, a priority information item of value equal to a maximum of values of input priority information items relating to inputs of said agent comprising a message packet for which the input required said corresponding output.

25. The system according to claim 24, in which said propagation module is designed to propagate, at an output of a queue, a link priority information item equal to a maximum level of priority information items of message packets present in said queue and a link priority information item of an input link of said queue.

26. The system according to claim 20, in which said parameter representative of the state of the network comprises a quantity of data stored in a queue of said initiating agent.

27. The system according to claim 20, in which said parameter representative of the state of the network comprises a number of periods of a clock timing signal controlling the sending of message packets from said initiating agent separating the sending of a request message packet from said initiating agent and the receipt of an associated response message packet.

28. The system according to claim 20, comprising a threshold value defining two levels of priority information, corresponding to priority message packets and non-priority message packets.

* * * * *

UNITED STATES PATENT AND TRADEMARK OFFICE
CERTIFICATE OF CORRECTION

PATENT NO. : 8,254,380 B2  
APPLICATION NO. : 11/516811  
DATED : August 28, 2012  
INVENTOR(S) : Philippe Boucard et al.

Page 1 of 1

It is certified that error appears in the above-identified patent and that said Letters Patent is hereby corrected as shown below:

On the Title Page Item (57) (Abstract), Line 9, Column 2, delete "agent," and insert -- agent --, therefor.

In the Claims

In Claim 3, Line 59, Column 9, delete "s" and insert -- is --, therefor.

Signed and Sealed this  
Seventh Day of May, 2013

Teresa Stanek Rea  
*Acting Director of the United States Patent and Trademark Office*